Sept. 14, 1937.                A. T. SMITH                 2,093,175
                              COOKING UTENSIL
                            Filed July 24, 1936
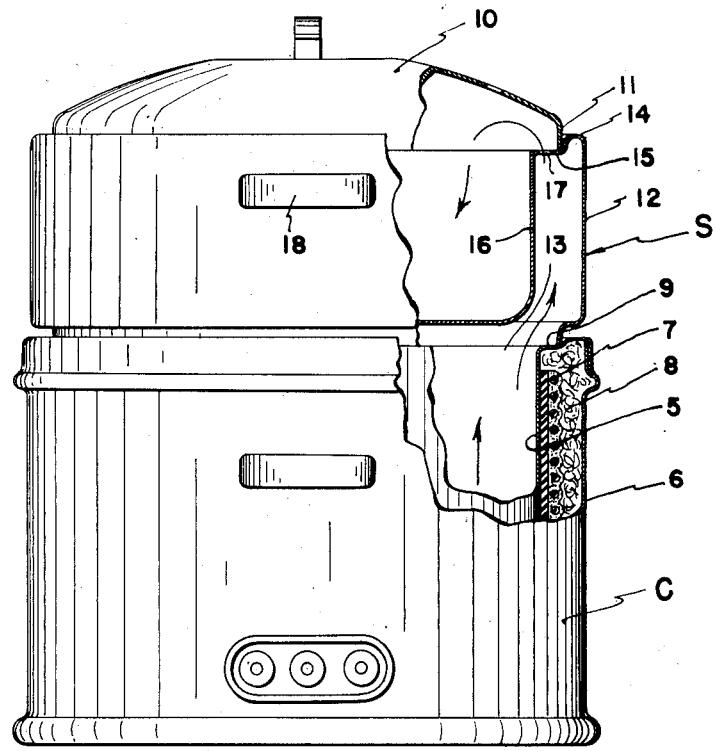
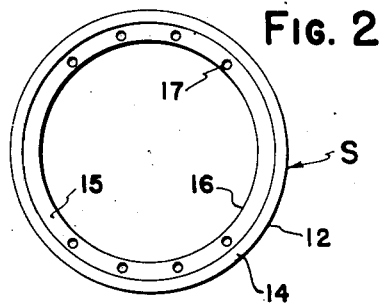
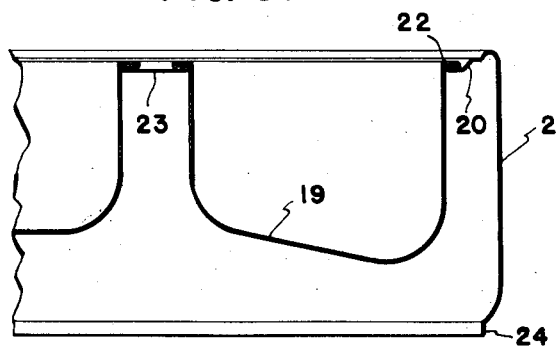
INVENTOR
ALVA T. SMITH
BY
ATTORNEYS Patented Sept. 14, 1937

2,093,175

UNITED STATES PATENT OFFICE 2,093,175

COOKING UTENSIL

Alva T. Smith, Milwaukee, Wis., assignor to National Enameling and Stamping Company, Milwaukee, Wis.

Application July 24, 1936, Serial No. 92,298

3 Claims. (Cl. 53—2)

This invention appertains to cooking utensils, and more particularly to a steamer attachment for electric roasters, casseroles, and the like.

One of the primary objects of my invention is to provide a novel device for facilitating the cooking of vegetables and other foods over an ordinary electric roaster or electric casserole without change thereto, and in such a manner that the cover of the casserole can be used, if so desired, as the cover for the steamer when the steamer is associated with the roaster or casserole.

Another salient object of my invention is to provide a unitary steamer embodying a main body portion formed from a single sheet of metal having its lower edge flanged inwardly for resting in the cover recess of the roaster or casserole, and its upper portion pressed inwardly to provide the food receptacle in case the steamer is to be used on a casserole, or flanged inwardly and crimped over the edges of a plurality of food receptacles in case the device is to be used over a roaster.

A further important object of my invention is to so arrange the food receptacle or receptacles relative to the outer wall of the steamer, that the steam rising from the casserole or roaster will be permitted to freely circulate around and between the receptacles and over and into the receptacles, the cover for the steamer acting to direct the steam toward the food being cooked.

A still further object of my invention is to provide novel means for forming the body of the steamer for receiving the cover, whereby the steam will be directed over the food being cooked, and so that any water of condensation collected on the edges of the cover will be returned into the casserole or roaster.

A still further object of my invention is to provide a unitary steamer attachment for electric roasters and casseroles, which will be of a simple and durable construction, and which can be manufactured and placed upon the market at a comparatively small cost.

With these and other objects in view, the invention consists in the novel arrangement, construction, and formation of parts, as will be hereinafter more specifically described, claimed, and illustrated in the accompanying drawing, in which:

Figure 1 is a side elevation of my improved steamer attachment, showing the same in use on an electric casserole, parts of the casserole and steamer being shown broken away and in section to illustrate structural details, Figure 2 is a top plan view of the steamer attachment for casseroles, showing the same on a smaller scale than Figure 1.

Figure 3 is a fragmentary longitudinal section through the steamer as constructed for use with an electric roaster.

Referring to the drawing in detail, wherein similar reference characters designate corresponding parts throughout the several views, the letter S generally indicates my improved steamer for an electric casserole C. The electric casserole C forms no part of my present invention and has merely been shown to illustrate the use of the steamer attachment.

As shown, the casserole C includes an inner pan or receptacle 5 arranged in spaced relation to and connected with an outer shell or casing 6. Arranged in relatively close proximity to the outer surface of the receptacle 5, but insulated therefrom, is the resistance unit 7. Suitable heat insulating packing 8 is arranged between the cooking receptacle 5 and the shell 6. It is to be noted that the upper edge of the casserole is rabbeted or set in, as at 9, for the reception of its cover. This cover is indicated by the reference character 10 and is shown in use on top of my steamer.

Where my steamer is utilized on relatively small electric cooking vessels, such as the casserole C, I preferably form the same from a single sheet of metal, and thus the steamer is of a unitary construction. The cover 10 is provided with a depending skirt 11.

The steamer S itself comprises an outer wall 12 having formed on its lower edge a depending offset flange 13, which is adapted to rest in the recess portion 9, normally occupied by the skirt 11 of the cover 10. The upper edge of the side wall 12 has formed thereon the inwardly directed bead 14 and the substantially horizontally disposed flange 15. The receptacle 16 for the food extends downwardly from the flange 15 in spaced relation to the outer wall 12.

The entire steamer is formed from one piece of metal, which can be enameled or otherwise treated, so that the same will present a pleasing appearance. The horizontal flange 15 has formed therein a plurality of openings 17, and the skirt of the cover 11 is adapted to rest on the flange 15 against the bead 14 outwardly of said openings. By referring to Figure 1, it will be noted that the bottom of the receptacle 16 terminates above the lower edge of the offset flange 13.

Suitable handles 18 can be provided for the steamer, and these handles can be welded or otherwise secured on the side wall 12 at the desired point.

In use of the improved steamer, the same is placed directly over the casserole C or other electric cooker, as shown in Figure 1, and obviously the steam arising from the cooker will be directed onto the bottom wall of the vessel 16, and then upwardly and around the vessel between the side wall thereof and the outer wall 12. Any steam flowing through the openings 17 will be impinged on the inner face of the cover 10 and then directed downwardly onto the food. Water of condensation collected on the cover tends to drip toward the flange 15, and this water will be directed back onto the cooker C through the openings 17.

In larger sized steamers, unitary idea is still carried out, but it is preferred to provide a plurality of vessels 19, which can be formed from separate pieces of metal. This type of steamer is shown in Figure 3 and is particularly adapted for use on top of electric roasters.

As shown in Figure 3, the upper edges of the cooking vessels 19 are folded or crimped over the inwardly directed flange 20 formed on the upper edge of the outer wall 21, as at 22. If desired, the top of the cooker can be in the nature of a depressed plate with openings therein for receiving the vessels 19, and the upper edges of the vessels can be welded or otherwise secured to said top plate. The top plate or flange 20 can be provided with openings 23 for the steam and water of condensation. The lower edge of the outer wall 21 is also provided with an offset flange 24 for resting on top of the roaster.

By constructing the large type steamer in the manner specified, I still provide a unitary steamer construction, in that after the welding and crimping takes place, the entire steamer functions as if the same were made from one piece of metal.

From the foregoing description it can be seen that I have provided an exceptionally durable and efficient type of steamer, which can be effectively used over electric cookers of different types.

Changes in details may be made without departing from the spirit or the scope of my invention, but what I claim as new is:

1. A steamer for use in conjunction with an electric cooker comprising a unitary body including an inner food receiving vessel, an outer wall surrounding the vessel, an inwardly offset depending skirt formed on the outer wall extending below the food vessel, a connecting flange between the upper edge of the outer wall and the upper edge of the vessel, said flange having an upstruck bead and openings inward of said bead for steam and water of condensation, and a removable cover having a depending skirt removably fitted on the flange beyond the openings and against said bead.

2. In a steamer for electric cookers comprising an outer wall having a depending offset skirt, a plurality of cooking vessels received within said wall, said vessels being arranged in spaced relation to one another and to said wall, and flanges permanently connecting the upper edge of the wall with the upper edges of the vessels, said flanges being apertured.

3. A cooking device comprising a lower vessel having an upstruck bead on its upper end, an upper removable vessel including an outer side wall having a depending offset skirt for removably engaging the upper end of the lower vessel against said bead, a food receptacle arranged within said outer wall in spaced relation thereto, and a flange connecting the upper edge of the outer wall and the upper edge of the receptacle together, said flange having an upstruck bead directly above and in axial alinement with the first bead, and a removable cover for fitting against either one of said beads.

ALVA T. SMITH.